United States Patent
Eyster et al.

(10) Patent No.: US 8,344,036 B2
(45) Date of Patent: Jan. 1, 2013

(54) METHOD OF PROCESSING SILICONE WASTES

(75) Inventors: Perry Eyster, Brownsberg, IN (US); James Bratina, Greenwood, IN (US); Thomas Roberts, Greenwood, IN (US); Christian Peregrine, Indianapolis, IN (US)

(73) Assignee: Heritage Environmental Services, LLC, Indianapolis, IN (US)

( * ) Notice: Subject to any disclaimer, the term of this patent is extended or adjusted under 35 U.S.C. 154(b) by 216 days.

(21) Appl. No.: 12/384,483

(22) Filed: Apr. 3, 2009

(65) Prior Publication Data

US 2009/0281202 A1    Nov. 12, 2009

Related U.S. Application Data

(60) Provisional application No. 61/042,143, filed on Apr. 3, 2008.

(51) Int. Cl.
*C08J 11/04* (2006.01)

(52) U.S. Cl. ........... 521/47.5; 521/40; 521/41; 556/460; 556/462; 556/465; 556/466; 422/129; 422/131; 422/135; 422/138; 422/146

(58) Field of Classification Search ........... 556/400, 556/431, 433, 434, 435, 436, 443, 444, 445, 556/446, 447, 450, 451, 460, 462, 464, 465, 556/466, 467, 468, 469, 470, 474, 478, 489; 521/40, 40.5, 41, 45.5, 46, 47.5; 422/129, 422/131, 135, 136, 137, 138, 145, 146
See application file for complete search history.

(56) References Cited

U.S. PATENT DOCUMENTS

| | | | |
|---|---|---|---|
| 3,558,681 A * | 1/1971 | Kuznetsova et al. | 556/461 |
| 5,397,842 A * | 3/1995 | Hamilton et al. | 525/263 |
| 5,578,700 A * | 11/1996 | Hunt et al. | 528/501 |
| 6,172,253 B1 | 1/2001 | Kawamoto | |
| 6,620,363 B2 * | 9/2003 | Farris et al. | 264/211.12 |
| 2006/0075944 A1 | 4/2006 | Whitney et al. | |
| 2009/0050525 A1 * | 2/2009 | Sappok et al. | 208/106 |

FOREIGN PATENT DOCUMENTS

| | | |
|---|---|---|
| EP | 01101811 A2 | 5/2001 |
| JP | 2004-107402 | 4/2004 |
| JP | 2005-307119 | 11/2005 |
| WO | WO 2006092306 A1 * | 9/2006 |

OTHER PUBLICATIONS

International Search Report from corresponding PCT application No. PCT/US2009/002090, dated Oct. 27, 2009, 3 pages.
Written Opinion of the International Searching Authority from corresponding PCT application No. PCT/US2009/002090, dated Oct. 27, 2009, 3 pages.
European Supplementary Search Report from corresponding EP application No. EP 09755200 dated Mar. 7, 2012 (6 pgs).

* cited by examiner

*Primary Examiner* — Frances Tischler
(74) *Attorney, Agent, or Firm* — Brinks Hofer Gilson & Lione

(57) ABSTRACT

A method of processing polymer materials, highly filled or otherwise to recover cyclic structures or monomers. The method involves providing a vessel having a heated side wall, an agitator, and at least one of an additional heated structure, other than the heated side wall, within the vessel and means for forming a thin coat of material processed in the vessel on said heated side wall. A polymer material is fed into the vessel and heated to a sufficient temperature to cause depolymerization of the polymer material into cyclic structures or monomers. The cyclic structures or monomers are removed from the vessel and collected. The method does not require the use of a solvent.

12 Claims, 2 Drawing Sheets

METHOD OF PROCESSING SILICONE WASTES

RELATED APPLICATION

The present application is based upon U.S. Provisional Patent Application Ser. No. 60/042,143, filed Apr. 3, 2008 to which priority is claimed under 35 U.S.C. §120 and of which the entire specification is hereby expressly incorporated by reference.

TECHNICAL FIELD

The present invention relates to silicone wastes and more particularly to methods for processing silicone wastes.

BACKGROUND ART

Silicone products such as silicone fluids, emulsions, sealants, rubber, tubing, etc. are currently being recycled by a catalytic depolymerization process that involves heating the silicone material to convert it into cyclic compounds which are recovered for reuse. This current process employs a batch vessel or batch reactor with heated sidewalls that transfers heat to the mixture therein and elutes, under vacuum, the desired oligomer—a cyclic siloxane.

These current batch operations are limited due to the minimal exposed area from which the oligomer may distill. Utilizing any heated surface above the liquid line requires sufficient agitation to propel material onto this surface. This becomes increasingly less effective as the oligomer elutes and product viscosity increases. Traditionally, this is overcome with the addition of a solvent into which the polymer is dissolved or suspended. Further, the heated surface below the liquid line initiates foaming and carry-over as the oligomer elutes through the increasingly viscous material. Again, the use of a solvent can prevent some carry-over by reducing the viscosity of the material to be recycled. However, the solvent, itself, can distill or carry-over with the desired oligomer requiring subsequent separation. Once the conversion to oligomer is complete, the fill material that remains must be separated from the often expensive solvent.

These current processes are therefore further hindered in that they cannot take the material to dryness in a single distillation step.

The present invention provides improved methods for processing silicone wastes which employ unique agitation to effectively utilize and/or increase the surface area within the reactor. This not only increases efficiency in depolymerization and oligomer recovery but also acts to prevent foaming without the need for solvent, allowing increased distillation rates and improved product put-through as the entire reactor volume is utilized for product alone not product plus solvent.

The present invention also provides a single-pass operation, taking the reactor contents from siloxane material to dry filler and/or catalyst regardless of the viscosity, fill content, or molecular cross-linking of the initial material

DISCLOSURE OF THE INVENTION

According to various features, characteristics and embodiments of the present invention which will become apparent as the description thereof proceeds, the present invention provides a method of recycling silicone polymers which involves:
providing a vessel having a heated side wall, an agitator, and at least one of:
  i) an additional heated structure, other than the heated side wall, within the vessel; and
  ii) a means for forming a thin coat of material processed in the vessel on said heated side wall;
feeding a polymer material into the vessel;
heating the polymer material in the vessel to a sufficient temperature to cause depolymerization of the polymer material into cyclic structures or oligomers; and collecting the oligomers.

BRIEF DESCRIPTION OF DRAWINGS

The present invention will be described with reference to the attached drawings which are given as non-limiting examples only, in which.

BEST MODE FOR CARRYING OUT THE INVENTION

Figure 1:
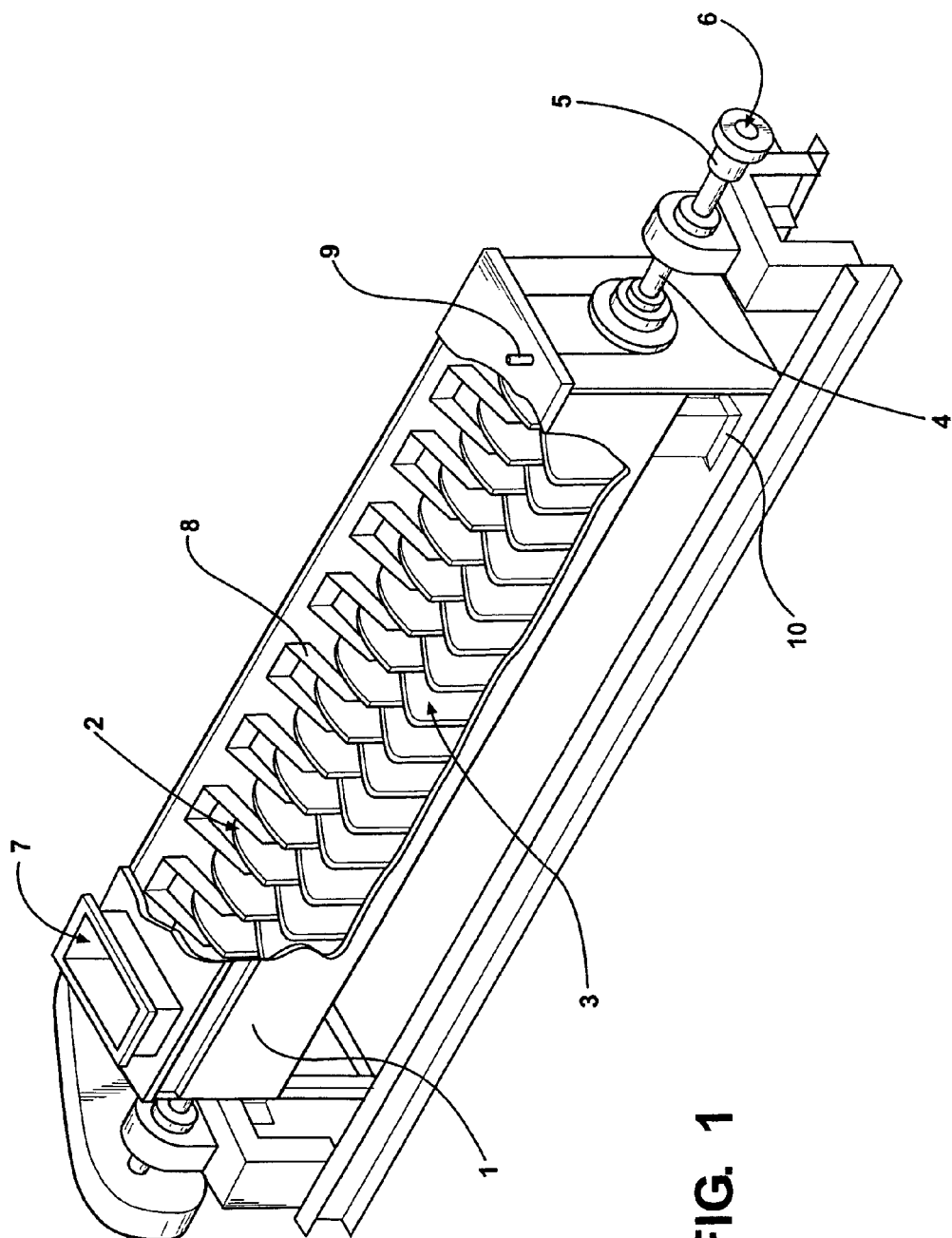
FIG. 1 is a perspective view of a commercially available thermal auger or thermal screw that can be used in accordance with the present invention.

The present invention is directed to methods of recycling silicone polymer materials, highly filled or otherwise, in the absence of solvent, which methods have improved processing rates and percent recovery as compared to prior art methods. The recycling of silicone materials according to the present invention can be conducted in batches as well as in a continuous addition process.

The method comprises the catalytic depolymerization of a material within a heated vessel or reactor. The vessel or reactor can include a heated or non-heated agitator and/or a structure that forms, on a heated surface, a thin coat of the material being processed. The polymer and catalyst are fed into the vessel or reactor and heated to a sufficient temperature to undergo depolymerization into oligomers. The oligomers are collected in the vapor phase and condensed.

As the oligomer is collected and the reactor contents deplete, additional polymer may be supplied to the reactor, further utilizing the initial catalyst. The unique reactor design affords the ability to take the reactor contents to dryness resulting in a free-flowing powder. In one embodiment of the invention, the polymer undergoes acidic catalysis prior to neutralization and alkaline depolymerization in the reactor. In another embodiment of the invention the catalyst is prepared through a ring-opening reaction of the cyclic oligomer and the addition of an alkali metal to both ends of the opened ring. In another embodiment of the invention an alkali hydroxide is introduced into the reactor for in-situ formation of the catalyst from the polymeric material, itself.

One embodiment of the present invention provides continuous addition to a "wet" reactor bed. Alternatively, the present invention allows for the addition of polymer to a dried reactor bed for "re-wetting" of dried fill material and catalyst, from a previous batch, as well as allowing for traditional batch processing whereby the contents are taken to dryness and discharged prior to introducing a fresh batch with fresh catalyst. The method can be used to process silicone materials such as fluids, emulsions, tubing, gloves, bands, sealants, rubber, or other highly viscous materials with improved yield and efficiency over traditional batch operations The methods of the present invention involve the use of mixing methods and apparatus in the depolymerization process that promote the formation of a thin film of the silicone material on heated surfaces of the processing equipment such that heat transfer surfaces are optimized and conversion and recovery is enhanced. The catalyst employed is created by a ring-opening reaction of the cyclic oligomer and the addition of an alkali metal to both ends of the resulting open ring. Thus a quantity of the cyclics can serve as a vehicle for delivery of an alkali disilanolate catalyst. In addition, the present invention allows for acid catalysis of materials, to effectively pre-digest the polymer, followed by a neutralizing step and then depolymerization in the reactor using the above stated alkali disilanolate catalyst.

The present invention also allows for the introduction of an alkali hydroxide, either dissolved in a suitable solvent or directly added to the reactor, for in-situ formation of the alkali silanolate catalyst. This in-situ formation of catalyst may follow acid pre-digestion and neutralization. Although corrosion studies conducted during the course of the present invention suggest that acid-catalyzed depolymerization results in excessive wear on the traditional materials of construction for heat transfer surfaces like stainless or carbon steel, one skilled in the art can envision a reactor made of or partially made of glass or non-reactive metals would permit the use of acid catalysis.

These features of the present invention are applicable to batch type systems, such as mixed vessels or tanks, and/or continuous process apparatus such as a thermal auger or thermal screw (or similar equipment) as discussed below.

According to the present invention the processing equipment is selected and/or configured to: 1) mix and/or spread the material being processed to create a thin film against a heated surface that improves the transfer of the heat into the material; and 2) improve eluting of the oligomer. These features are applicable to both batch and continuous processes according to the present invention. These processes include either the use of a suitable agitator that spreads the silicone material onto a heated surface and/or an agitator as the heated surface itself. In the former, the agitator acts to spread the vessel contents into a thin film upon a heated surface from which the formed oligomers may then easily distill. In the latter description, a thermal auger or thermal screw type device (or similar equipment) provides the mixing and spreading by employing breaker bars that assist in distributing material along the surface of the auger or screw type device while incorporating increased surface area for the heat transfer, film formation, and distillation of oligomer.

FIG. 1 is a perspective view of a commercially available thermal auger or thermal screw that can be used in accordance with the present invention. The thermal auger or thermal screw shown in FIG. 1 is commercially available from Bethlehem Corporation, Easton, Pa. The thermal auger (or thermal screw) used in the present invention includes a jacketed vessel 1 which houses an agitator 2 that is provided with radially extending paddles 3. The jacketed vessel 1 of the thermal auger (or thermal screw) can be configured with an inlet and an outlet (not shown) that are used to pass a heat-transfer medium through the jacket in a conventional manner. The inlet and outlet can be provided at any desired location in the jacket. The paddles 3 of the agitator 2 are likewise provided with hollow chambers with fluid channels that communicate with the drive or rotary shaft 4 and allow for a heated heat-transfer medium to pass and circulate through the paddles 3. The heated heat-transfer medium can be circulated through the rotary shaft 4 and paddles 3 through an inlet 5 and outlet 6 that are coupled to the rotary shaft 4 as depicted in FIG. 1.

The thermal auger (or thermal screw) includes a material inlet 7, through which silicone wastes can be fed into the thermal auger (or thermal screw). Breaker bars 8 can be provided which extend between the paddles 3 and break up material that gets caught between adjacent rotating paddles 3.

In operation, silicone materials are continuously fed into the thermal auger (or thermal screw) through the material inlet 7. The silicone materials become mixed by the paddles 3 of the agitator 2 and contact the heated inner surface of the jacketed vessel 1 and the heated surfaces of the paddles 3. As the polymer is heated it becomes converted under catalytic action into cyclic oligomers that are distilled off. The distilled oligomers move through a vapor outlet 9 and are then condensed and collected outside of the jacketed vessel 1. Additional silicone material may be fed continuously into the jacketed vessel 1 as the oligomers elute. Upon completion of the conversion, filler content from the silicone material and the catalyst charge remains in the jacketed vessel 1 and can be propelled by action of the auger flights toward outlet 10.

The use of a thermal auger (or thermal screw) system provides a large surface area from which the formed oligomers may distill. Such systems are much more energy efficient than current batch operations through increased distillation rates, enhanced recovery, and single-pass operation. The overall capital cost for an auger system is believed to be much lower than the number of batch systems that would be required for a processing system with the same capacity. Reductions in operating costs are also realized through improved yields and by effectively using a single catalyst charge for multiple batches in the continual addition process.

During the course of the present invention it was determined that in addition to providing a large collective surface area for heat transfer into the silicone wastes, a thermal auger (or thermal screw) could be configured to, in addition to mixing the silicone wastes, spread the silicone wastes to form a thin coat on the heated surfaces of the reactor. In the case of a thermal auger (or thermal screw), the jacket vessel 1 could have a cylindrical shape or at least an internal circular cross-sectional shape that provides a clearance between the inner surface of the vessel jacket 1 and the outer edges of the paddles 3 so that rotation of the paddles 3 can assist in spreading the silicone wastes and forming a thin film on the inner surface of the vessel jacket 1. Likewise, the paddles 3 could be configured, e.g., to have an axial dimension at their outer edges, which assist in spreading the silicone wastes and forming a thin film on the inner surface of the vessel jacket 1. It is also within the scope of the present invention to configure the breaker bars 8 and/or paddles 3 so that the clearance between the breaker bars 8 and paddles 3 assists in spreading the silicone wastes and forming a thin film on at least part of the surfaces of the paddles 3 as the paddles rotate past the breaker bars 8.

As in the case of thermal augers (or thermal screws) discussed above, for batch processing of silicone wastes, a vessel with a heating means such as a jacket through which a heated heat-transfer medium can circulate, electrical heated bands, or other suitable heating means can be used in conjunction with an agitator that has blades or paddles or other structure that is configured to assist in spreading the silicone wastes and forming a thin film on the inner surface of the vessel. Alternatively, or in addition, the agitator can be configured to be heated in order to provide additional heated surfaces for the silicone wastes to contact. For example, the agitator can be provided with paddles or blades that have cavities through which a heated heat-transfer medium can flow.

In addition to providing means to increase the heated surface area of the processing equipment which is contacted by the silicone material during processing and providing for means to spread and form a thin film of the silicone wastes on the heated surfaces, according to the present invention the silicone wastes materials can be subject to size reduction before or after being fed into the processing equipment. For example, the silicone wastes materials can be ground, milled, shredded, etc. prior to being fed into the processing equipment. Alternatively, or in addition, the processing equipment could be provided with internal mechanisms such as auxiliary grinders, choppers, shredders, or cutting blades or structure such as cutting blades of fins on the agitator blades or paddles that are designed and configured to assist in breaking down large pieces, masses or volumes of the silicone waste materials during processing.

It is noted that a thermal auger or thermal screw has been used as an example of processing equipment that can be used for continuous processing; the invention is not limited to the use of a thermal auger or thermal screw. Other continuous and stage-wise equipment can be used which can be heated and provided with heated agitators and/or devices that spread thin films of material being processed on heated surfaces of the equipment.

It is further noted that while the present invention is primarily directed to processing silicone waste materials, the equipment and techniques described herein can be used to process and depolymerize other types of polymers.

The silicone cyclics that are obtained by the process of the present invention can be offered as commercial products or otherwise upgraded to a polymer.

Figure 2:
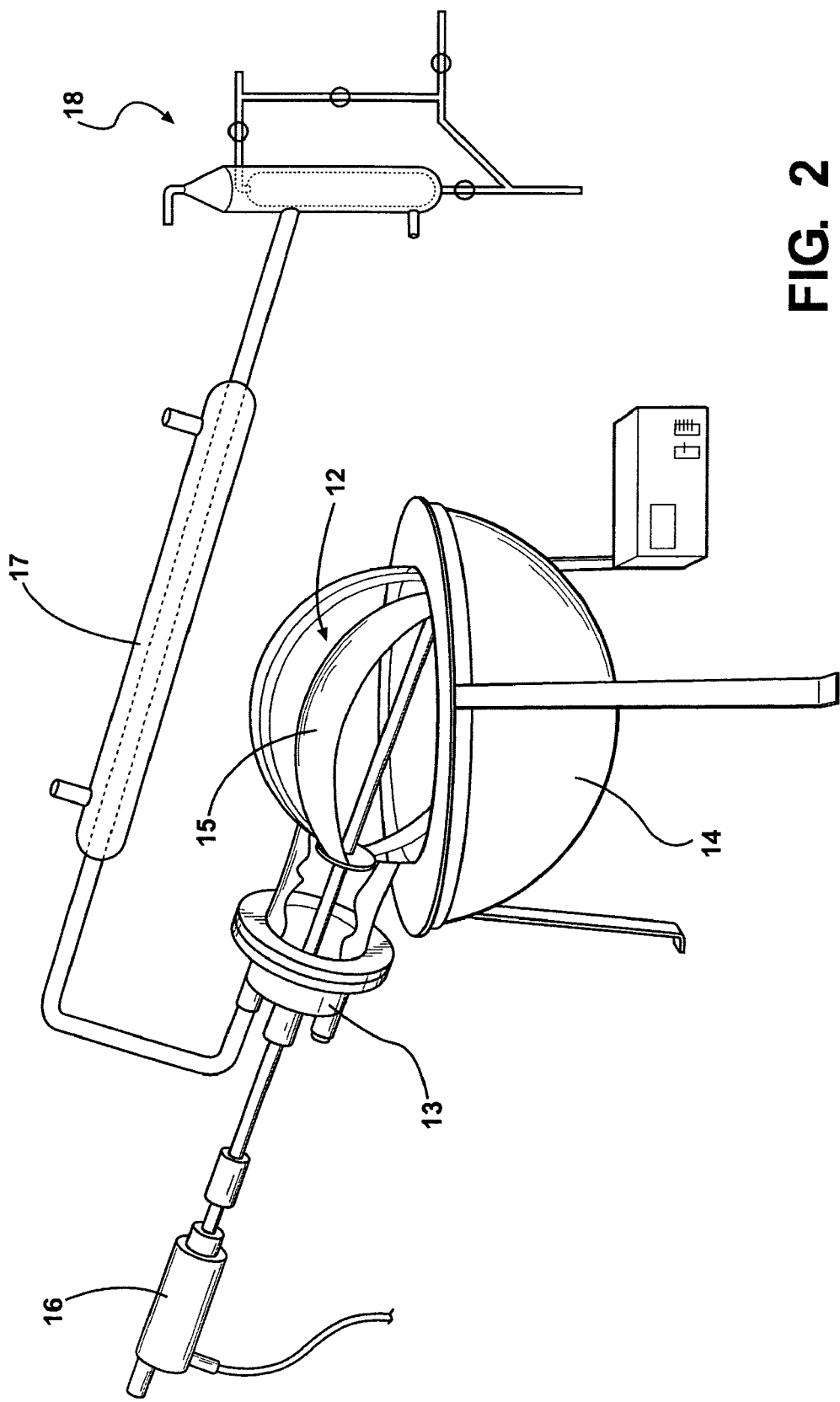
FIG. 2 is a diagram of a laboratory reactor that can be used in accordance with the present invention.

FIG. 2 is a diagram of a laboratory reactor that can be used in accordance with the present invention. This laboratory reactor, which was used and is referred to in the working example below, includes a reactor 12 that was constructed using a 12 L glass round-bottom vessel fitted with a stainless steel reactor head 13. The reactor 12 was tilted in a heating mantle 14 such that the agitator is approximately 30 degrees from horizontal. The portion of the reactor 12 above the heating mantle was fitted with a heated jacket (not shown). The reactor 12 was also fitted with a prototype expandable agitator 15 to conform to the shape of the reactor 12 and allow distribution of material into a thin film against the inner walls of the reactor 12. The agitator 15 was rotated by an air drive motor 16. A spiral glass condenser 17, temperature regulated by an external chiller (not shown), was used for capture of the oligomer and delivery through a vacuum manifold distillation receiver 18.

The following non-limiting examples will more fully illustrate the embodiments of this invention. All parts, percentages and proportions referred to herein and in the appended claims are by weight unless otherwise indicated.

EXAMPLE 1

Continuous Addition

A 1000 g sample of siloxane sealant was added to a reactor 12 fitted with an apparatus to allow continual addition of two, separate, 1000 g samples of additional siloxane sealant from a small external storage vessel (See FIG. 2). Also added to the reactor 12 were 291 g of a previously prepared potassium silanolate catalyst equivalent to 7% KOH by mass of the siloxane content in the initial 1000 g charge. The reactor 12 was sealed and heating and agitation applied. After heating for 15 minutes, vacuum was applied. Distillation and recovery of siloxane cyclics began at a temperature of 140° C. and an absolute vacuum of 15 mm Hg. The distillation rate increased as the reactor temperature approached 200° C. Reactor temperature and vacuum were subsequently maintained at these conditions.

Upon recovery of approximately 300 g of cyclics, equivalent to 50% of the total siloxane component of the initial charge, the contents of the attached storage vessel were slowly administered via the applied vacuum. Intermittently during this process, the addition was slowed and/or halted to allow reactor temperatures and vacuum to stabilize such that consistent distillation rates were maintained.

The cumulative recovery of distilled and condensed cyclics exceeded the known siloxane content of the initial charge and the continual addition process was confirmed. Further, catalysis and distillation of the continuously added material resulted in the recovery of cyclics at a rate consistent with that of the initial charge. After approximately 100 g of siloxane material had been delivered from the storage vessel to the reactor, continuous addition was halted entirely. The reactor contents were then distilled to dryness. Solids remaining at this point are comprised of the filler component of the siloxane sealant and potassium silanolate catalyst. The remaining 1000 g of siloxane material was then administered to the reactor, via the applied vacuum, to evaluate the catalytic activity remaining in the now dry reactor bed. The distillation and recovery of cyclics was re-initiated but at a substantially diminished rate. This rate reduction was later determined to be a result of decreased effective catalyst content. As the sealant entered to the reactor, pelletizing occurred and catalytic activity was limited to the interface between the liquid pellet and its dry outer coating containing the actual catalyst.

Overall, this lab-scale operation confirms that the continual addition process, afforded by the unique reactor, decreases over-all catalyst usage while maintaining efficient cyclics recovery even as total fill content within the reactor builds and viscosity increases.

Further, highly viscous materials, such as tubing or gum, and highly filled materials such as sealant and rubber have been successfully recycled in this reactor, in a single pass, taken to dryness, with no need for subsequent processing of the remaining reactor contents for improved yield. The ability to recycle highly filled materials also affords the application of other inexpensive catalysts. Many silicone materials are more efficiently catalyzed using p-toluene sulfonic acid or sulfuric acid. These catalysts are either expensive or have a tendency to distill with the formed cyclic compounds. Pre-digestion or catalysis of such materials using sulfuric acid can easily be performed followed by neutralization of the sulfuric acid to a sulfate salt. The salt simply adds to the total fill content of the material, now ready for basic catalysis in the herein described process.

EXAMPLE 2

Pilot Scale Trial
Acid Pre-Digestion

The pilot trials in this example utilized a Model 1P1203JTB Porcupine® Processor originally developed by the Bethlehem Corporation and exclusively licensed by Advanced Thermal Solutions (ATS) of Emmaus, Pa. The primary reactor feature involves a heat-jacketed "U" trough design with a hollow internal mixing shaft. This dramatically increases heat transfer surface area when the hollow shaft is filled with a heat transfer medium such as steam or hot oil. The specifications of this reactor were as follows:
  Diameter: 1 ft
  Length: 3 ft
  Volume: 2.1 ft$^3$
  Heat Transfer Area:
    jacket: 9 ft$^2$
    mixing shaft: 15 ft$^2$
  Material of Construction: 316L Stainless Steel
  Pressure rated to 50 psi and full vacuum at 550° F.

Maximum Hot Oil Temperature: 650° F.
Peripheral Equipment:
   hot oil heater
   heated vapor pipe
   shell and tube vapor condenser
   vacuum condensate reservoir
   liquid ring vacuum pump system During the course of the present invention it was discovered that for certain types of silicone materials, only an acid catalyzed system of depolymerization is effective. In addition to the concerns of cost and the potential for the acid to distill with the product, there was a concern about the corrosive effects that these materials would have on a stainless steel reactor. A corrosion study was performed prior to initiating this example. The conclusions were that neither carbon steel nor stainless is suitable if one wished to extend the range of performance of the reactor. Laboratory results conducted during the course of the present invention suggested pre-digestion with acid prior to neutralization would render these materials susceptible to base catalyzed depolymerization.

This acid pre-digestion procedure was implemented on silicone tubing which had been previously shredded down to a nominal size of ¼". The tubing contains nearly all cross-linked siloxanes with a small percentage of inert filler. A 35 lb sample of tubing was mixed with 35 lb of siloxane fluid, for viscosity reduction, and 4.2 lb $H_2SO_4$. This mixture was blended for five hours. Afterwards, 6.2 lb $CaCO_3$ was added to neutralize the acid. Finally, a solution of 6.2 lb KOH dissolved in 42 lb isopropyl alcohol was blended into the siloxane solution.

The Porcupine® Processor was loaded with the entire batch totaling 128.6 lb. The isopropyl alcohol and oligomer were recovered over the course of the trial, and 27.2 lb of solids were removed at the end of the five hour batch time (including reactor cool-down).

This trial yielded a 68.4% recovery. The poor mass-balance is attributed to the substantial loss of the distillates into the vacuum pump seal water and the dispersed solids remaining on the 24 sq. ft of surface area within the reactor. Oligomer recovered from the seal water was comprised primarily of hexamethylcyclotrisiloxane, or $D_3s$, due to their lower boiling point than the $D_4$ and $D_5$ cyclic oligomers. This system utilized city water to cool the condenser. A chiller would close the mass-balance by preventing the loss of oligomer. Analysis of the solids recovered from the reactor revealed a siloxane content of 15%. Within the recovered solids, however, there were small pellets of undigested tubing. It was determined that additional acid or an extended reaction time during pre-digestion should be utilized.

EXAMPLE 3

Pilot Scale Evaluation
Highly-Filled Rubber

In this Example 35 lb of highly-filled silicone rubber was blended with 35 lb of siloxane fluid using a high speed dispersion blade for 2.5 hours. To this blend, was added a solution comprised of 5 lb of KOH dissolved into 28 lb of isopropyl alcohol. After blending for one hour, the contents were delivered to the Porcupine® Processor. The reactor was sealed, the hot oil setpoint was tuned to 200° F., and the vacuum in the reactor reached 27.5 in Hg. Following recovery of the bulk of the isopropyl alcohol, the hot oil set-point was increased to 410° F. The trial lasted five hours and was a success as the inert material went to dryness.

The mass-balance of this conversion was 73.4%. Analysis of the solids revealed 6.4% siloxane content remaining. Improvements in material management will see this number reduced. Additionally, the limited access to equipment, specific in design, for shearing many of the materials, necessitated the addition of a diluent in the form of siloxane fluids. Laboratory results, and the fact that the blended materials quickly build in viscosity during the course of the distillation, demonstrates the feasibility of such conversions yielding excellent recoveries with little or no diluent necessary. This can be realized in a properly engineered, full-scale operation.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A method of depolymerizing silicone materials, highly filled or otherwise which comprises:
providing a vessel having an inlet and an outlet, a heated side wall, an agitator which is internally heated by a fluid media and which mixes and transports materials though the vessel between the inlet and outlet;
feeding a silicone material into the vessel as at least one of, unprocessed silicone materials, or
pre-digested silicone materials together in a neutralized pre-digestion reaction mixture;
heating the silicone material in the vessel to a sufficient temperature to cause depolymerization of the silicone material into oligomers that are in a vapor phase;
removing the oligomers from the vessel as vapors; and
collecting and condensing the oligomer vapors.

2. A method of depolymerizing silicone materials, highly filled or otherwise according to claim 1, wherein the vessel comprises a thermal auger or a thermal screw.

3. A method of depolymerizing silicone materials, highly filled or otherwise according to claim 2, wherein the additional heated structure comprises paddles the thermal auger.

4. A method of depolymerizing silicone materials, highly filled or otherwise according to claim 3, wherein the paddles of the thermal auger are configured to have a clearance with respect to the heated side wall of the vessel which is sufficient to spread a thin coat of material processed in the vessel on said heated side wall which thin coat of material is sufficiently thin to enhance the transfer of heat from the side wall of the vessel into the material processed in the vessel.

5. A method of depolymerizing silicone materials, highly filled or otherwise according to claim 3, wherein the silicone material comprises silicone waste material.

6. A method of depolymerizing silicone materials, highly filled or otherwise according to claim 1, further comprising providing a silanolate catalyst in the vessel with the silicone material.

7. A method of depolymerizing silicone materials, highly filled or otherwise according to claim 6, wherein the silanolate catalyst is formed by the addition of an alkali metal to both ends of a cyclic oligomer in the process of a ring-opening reaction and is formed in the vessel or formed prior to being introduced into the vessel.

8. A method of depolymerizing silicone materials, highly filled or otherwise according to claim 1, wherein the pre-digested silicone material is pre-digested using an acid followed by neutralization to allow for efficient basic catalysis and depolymerization.

9. A method of depolymerizing silicone materials, highly filled or otherwise according to claim 1, wherein the oligomers are collected under vacuum.

10. A method of depolymerizing silicone materials, highly filled or otherwise according to claim 1, wherein the silicone material is fed into the vessel without any solvent being present.

11. A method of depolymerizing silicone materials, highly filled or otherwise according to claim 1, wherein the silicone materials comprise at least one of a silicone fluid, a silicone emulsion, a silicone sealant, a silicone rubber, a silicone gum, silicone tubing, a silicone band and a silicone glove.

12. A method of depolymerizing silicone materials, highly filled or otherwise according to claim 1, wherein the depolymerization process is conducted until a substantially dry powder residue is produced in the vessel.

* * * * *